J. P. KARNS.
COUTTER HEAD FOR TUNNELING MACHINES.
APPLICATION FILED MAY 25, 1909.
977,955.
Patented Dec. 6, 1910.
4 SHEETS—SHEET 2.
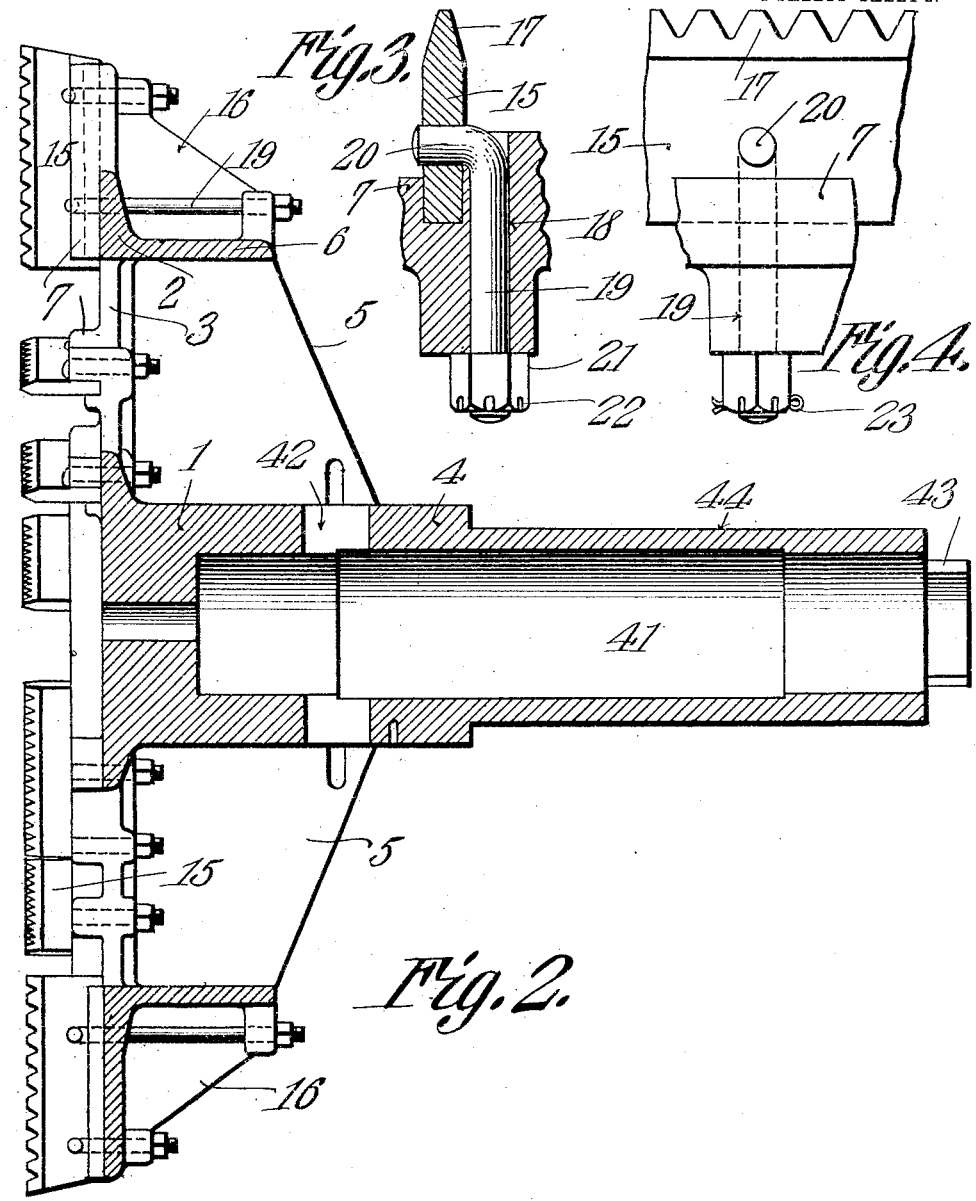
Witnesses
E. F. Stewart
F. T. Chapman
Inventor
John P. Karns.
By C. A. Snow & Co.
Attorneys

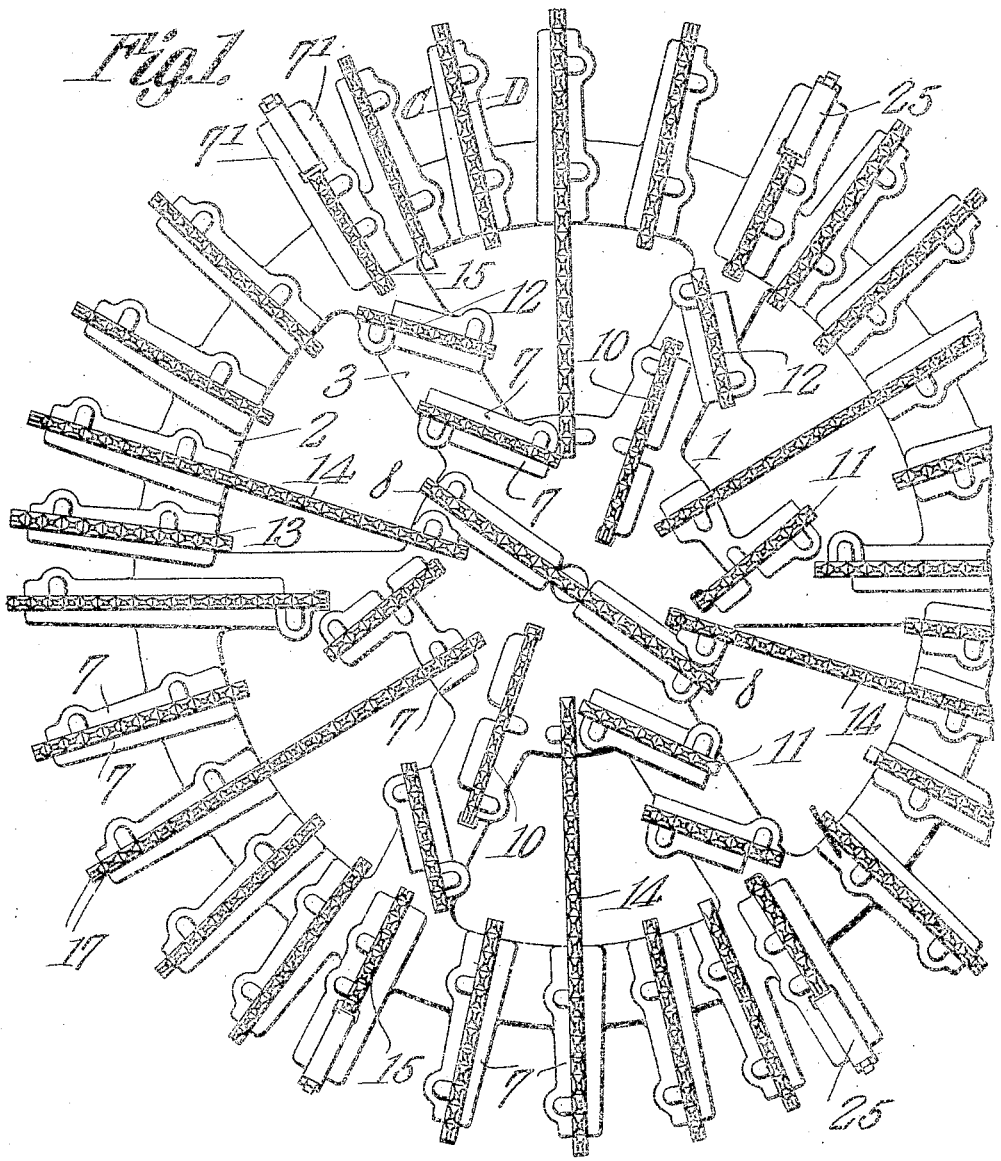

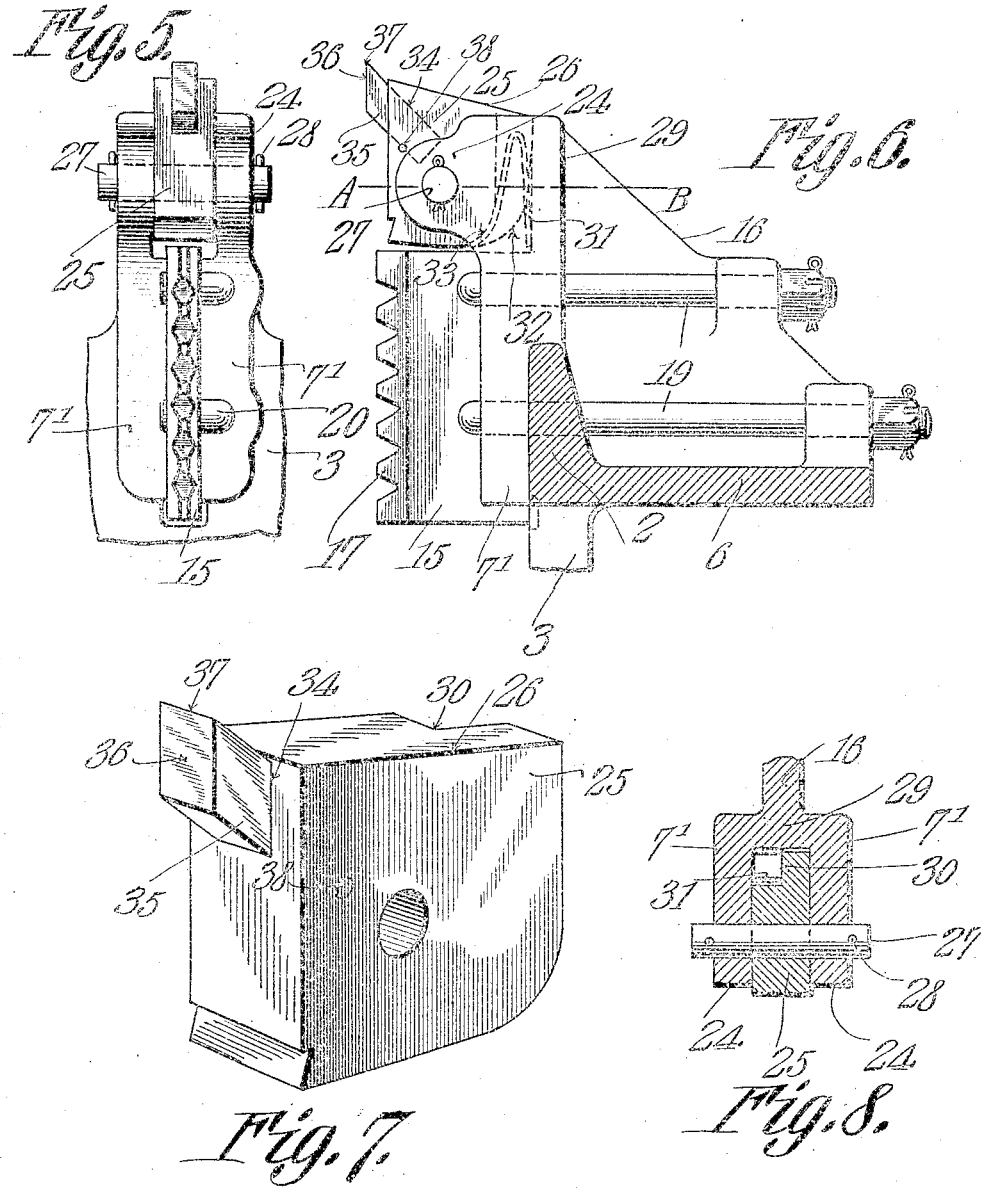

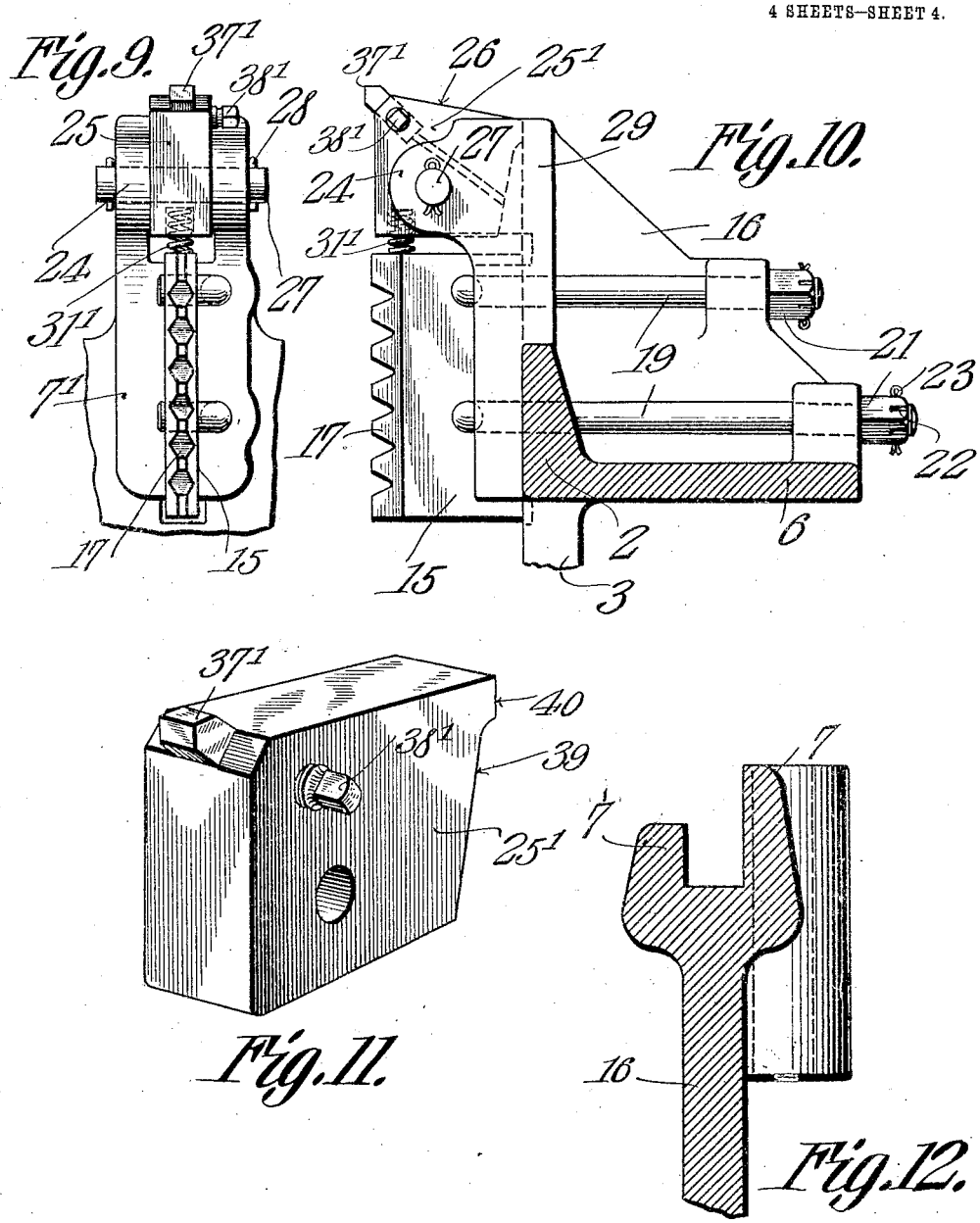

UNITED STATES PATENT OFFICE.

JOHN PRUE KARNS, OF BOULDER, COLORADO, ASSIGNOR TO J. P. KARNS TUNNELING MACHINE CO., OF BOULDER, COLORADO.

CUTTER-HEAD FOR TUNNELING-MACHINES.

977,955.

Specification of Letters Patent.    Patented Dec. 6, 1910.

Application filed May 25, 1909.    Serial No. 498,244.

*To all whom it may concern:*

Be it known that I, JOHN PRUE KARNS, a citizen of the United States, residing at Boulder, in the county of Boulder and State of Colorado, have invented a new and useful Cutter-Head for Tunneling-Machines, of which the following is a specification.

This invention has reference to improvements for cutter heads for drilling machines and is designed to provide a cutter head for a drilling machine of the type shown and described in Letters Patent #892,849 granted July 7, 1908, on an application filed by me for improvements in drilling machines.

In accordance with the aforesaid Letters Patent there is provided a cutter head spider carrying on the active face numbers of cutter blades so arranged as to cut or chip the breast of a tunnel by the bodily movement of the cutter head toward the said breast of the tunnel and to reach all portions of the breast of the tunnel by the slow rotative movement of the cutter head while being reciprocated.

In accordance with the present invention the general structure of the cutter head is improved and furthermore there are added trimmers designed to smooth or finish the wall of the tunnel, and these trimmers are carried by the cutter head and are active on the active stroke of said cutter head.

The invention will be best understood from a consideration of the following detail description taken in connection with the accompanying drawings forming a part of this specification in which drawings:

Figure 1 is an elevation of the active face of the cutter head. Fig. 2 is a diametric section of the cutter head. Fig. 3 is a detail section through one of the cutter blades and its support and the means for fastening the cutter blade to the cutter head. Fig. 4 is an elevation of a portion of a cutter blade and its support. Fig. 5 is a face view of one of the trimmers and adjacent cutter blade. Fig. 6 is a side elevation of the same showing a portion of the cutter head web in section. Fig. 7 is a perspective view of one of the trimmers. Fig. 8 is a section on the line A—B of Fig. 6. Fig. 9 is a face view of a modified form of trimmer and adjacent cutter blade. Fig. 10 is an elevation of the same with the cutter head spider in section. Fig. 11 is a perspective view of the modified form of trimmer. Fig. 12 is a detail section on the line C—D of Fig. 1.

Referring to the drawings there is shown in Figs. 1 and 2 a cutter head spider comprising a hub 1, a rim 2, and connecting spokes 3 radial to the hub. The hub 1 is provided with an extension 4 projecting to the rear, that is, in a direction away from the active face of the cutter head, for a considerable distance. The spokes 3 are strengthened by webs 5 of ample depth in the direction of the rearward extension 4 of the hub 1. The rim 2 is also provided with a rearward extension 6 concentric with the hub. The hub 1, spokes 3, rim 2 with the webs 5 and concentric extension 6 may be all cast in one piece, or in more than one piece in the larger sizes as is customary in castings of this character.

Formed on the front face of the hub, spokes, and rim are parallel spaced ribs 7 arranged in pairs and designed to receive and hold cutter blades. The ribs 7 are so disposed that some of the blades will be radial to the axis of rotation of the cutter head and other blades will be tangential to circles described about such axis of rotation.

In the particular structure shown there is a cutter blade 8 extending across a diameter of the hub and extending at each end beyond the periphery thereof. There are also comparatively long blades 10 extending over a portion of the face of the hub and out along adjacent spokes or arms 3, these blades 10 being arranged tangential to a circle included in the space between the inner ends of the ribs 7 carrying the blade 8. There are also other blades 11 partially included on the hub and partially included on some of the spokes or arms 3 and substantially tangential to a circle closely adjacent to the periphery of the hub. There are other blades 12 carried entirely by the spokes or arms 3 and but slightly out of parallelism with the blades 11 and there are other blades 13, 14, 15 all substantially radial to the axis of rotation of the cutter head and all, with the exception of the blades 13 seated in pockets or receptacles formed between ribs 7 formed on the rim 2 only and projecting therefrom radially outward and at the portions beyond the periphery of the rim 2 connected to the rear extension 6 of the rim by webs 16. The blades 14, however extend to the hub 1 and are there seated between ribs 7 formed on said hub. The blades 13 instead of being radial to the axis of rotation are closely adjacent to and parallel with a radial plane and extend for a distance toward the hub along a corresponding spoke or arm 3. The blades 15 extend onto the arms or spokes 3 toward the axis of rotation for a very short distance and since the ribs receiving the blades 15 also serve as holders for other members these particular ribs are designated in the drawings by the reference numeral 7'.

The blades carried by the cutter head are so disposed that every portion of the breast of the tunnel is acted upon by one or more of them as the cutter head is reciprocated and slowly revolved about its longitudinal axis.

The cutter blades are made of tool steel of suitable thickness and length and along the outer edge these blades are formed with teeth 17 capable of acting on the material to be cut or drilled.

The spaces between the ribs 7—7 are so proportioned as to receive the edge of a cutter blade remote from the teeth 17 in such manner that the blade will fit snugly in the space or groove so formed. In one or both ribs 7 there are formed passages 18 each adapted to receive the rod 19 having at one end an angle extension 20 and at the other end threaded to receive a nut 21 in the outer edge or face of which latter there are formed radial recesses 22 designed to receive a cotter pin 23 or other suitable device passed through a suitable perforation in the threaded end of the rod 18 and constituting a nut lock for the nut 21. The passages or perforations 18 extend through the ribs 7 and through the hub 1, arms or spokes 3, and rim 2 as the case may be and the threaded ends of the rods are all accessible from the rear face of the cutter head spider so that the nut 21 may be adjusted from time to time as may be necessary.

Each cutter blade is provided with one or more perforations designed to receive the angle end 20 of a rod 19, the said rod then acting as an anchor for the blade securely holding the same in its seat between the proper ribs 7. The rods or anchors 19 will hold the blades firmly in place while at the same time the removal of a blade and the replacing of the same with a new blade is readily performed.

The ribs 7' differ from the ribs 7 in having at their outer ends ears 24 spaced apart to a greater extent than are the facing walls of the ribs 7' and projecting forwardly from the said ribs. The ears 24 are designed to carry a block 25 between them, the said block being substantially rectangular in outline with the upper face 26 beveled in a direction toward the rear of the cutter head and this block is pivotally mounted on a pin 27 passing through the ears 24 and secured therein by any suitable means such for instance as cotter pins 28. The ribs 7' where they extend beyond the periphery of the rim 2 are connected together by a yoke 29 formed integral with the ribs and also with the web 16 and the rear edge of the block 25 is adapted to engage the front wall of the web 29 when the block is moved in one direction about the pivot pin 27.

The block 25 is formed on the rear edge with a recess or rabbet 30 designed to house a spring 31 tending to maintain the rear edge of the block 25 in engagement with the front wall of the web 29. Since the block 25 is designed to turn on the pivot pin 27 one corner of the block is rounded on the axis of the pin as a center as indicated at 32 while the corresponding portion of the rabbet 30 may be rounded as indicated at 33 for engagement therewith of the spring 31 which latter may be a leaf spring bent on itself and suitably curved to engage the curved wall 33 of the rabbet 30 thus preventing accidental escape of the spring from the said rabbet.

Entering the block on the upper portion of the front face thereof is a recess 34 entering the block diagonally and seated in this recess is a trimmer point 35. The recess 34 is preferably square in cross section and the trimmer point 35 is made of a square bar of tool steel adapted to fit snugly in the recess 34. The active end of the trimmer point 35 may be beveled as indicated at 36 and the cutting edge 37 will project beyond the line of the beveled wall 26 when the trimmer point is active. A pin 38 passed through the block 25 serves to lock the trimmer point 35 in place.

A somewhat different form of trimmer is shown in Figs. 9, 10 and 11. In this structure the trimmer block 25' has the rear edge cut away along its entire width as indicated at 39 so that at the upper corner there is formed a shoulder 40 for engagement with the rear wall of the web 29, the cut-away portion 39 permitting the rocking of the block on the pin 27 in a direction to carry the shoulder 40 away from the front wall of the web 29. In this form of trimmer the trimmer point has a right angle active end 37' and this point is held in place by a set screw 38'. A spring 31' interposed between the block and the adjacent end of the cutter blade held between the ribs 7', and seated in a recess in the trimmer block or support serves to maintain the shoulder 40 normally in engagement with the front face of the web 29. The rear extension 4 of the hub 1 is formed with a longitudinal passage 41 for the reception of a suitable shaft which latter however is not shown in the drawings. At an appropriate point the rear extension 4 of the hub 1 is traversed by passages 42 for a suitable key securing the hub and shaft together, but this key is omitted in the drawings. At the rear end of the rear extension 4 of the hub 1 there are formed wings 43. Furthermore, the rear extension 4 of the hub 1 is reduced in diameter externally as indicated at 44.

The operation of the structure shown in the present case is similar to that of the like structure shown in the aforesaid patent. The cutter head is given a reciprocatory movement in the direction of the longitudinal axis of the said cutter head and at the same time is given a slow rotative movement by means like those shown in the aforesaid patent for the same purpose. When the cutter head is moved axially forward the breast of the tunnel receives a blow from all the cutter blades simultaneously. On the retraction of the cutter head it receives a slight rotative movement and on the next forward movement strikes the breast of the tunnel at different points than at the first blow with the result that fresh surfaces are chipped away. The blows are continued and because of the disposition and number of the cutter blades the entire breast of the tunnel is acted upon by a fraction of a turn of the cutter head and on a complete turn of the cutter head the breast of the tunnel will have been acted on its entire surface several times.

The path described by the trimmer points about the longitudinal axis, or the axis of rotation of the cutter head defines the diameter or bore produced by the machine. When the cutter head is moving rearwardly then the trimmer points ride idly along the walls of the tunnel, the springs 31 or 31′, as the case may be, yielding. On the forward or active movement of the cutter head the springs 31 or 31′ force the trimmer points outwardly and these points act on the wall of the bore to cut away any irregularities or any portions unacted upon by the outer ends of the outermost cutter blades. Since on each retractive movement of the cutter head it is given a rotative movement, the trimmer points on a forward movement of the cutter head act upon fresh portions of the wall of the tunnel, but the rotative movement is not so great but that the path described by a trimmer overlaps or joins the path described by the trimmer on the next preceding forward movement of the cutter head. Thus the bore of the tunnel is finished smooth and it is rendered cylindrical irrespective of the action of the cutter blades upon the breast of the tunnel.

What is claimed is:—

1. A cutter head for tunneling machines having a circular series of radial cutter blades of which a number are of less radial extent than the others, said cutter blades being adapted to deliver impact blows upon the breast of the tunnel, and pivotally mounted trimmers exterior to and in radial alinement with the shorter radial cutter blades, said trimmers being elastically impelled toward the active position and inactive on the retractive movement of the cutter head.

2. A cutter head for tunneling machines having cutter blades adapted to deliver impact blows on the breast of the tunnel, and trimmers carried by the cutter head at the periphery thereof each consisting of a pivoted block and a trimmer point removably carried thereby.

3. A cutter head provided with cutter blades and having spaced parallel ribs constituting holders for the cutter blades, a portion of the cutter blades being arranged in circular series of less radial extent than others and the ribs beyond the ends of the blades of less radial extent being formed into matching ears, and trimmers located between said ears and pivotally connected thereto.

4. In a tunneling machine, a cutter head provided with a circular peripheral series of radial seats, cutter blades in said seats, some of the cutter blades being of less radial extent toward the periphery of the cutter head than others, and trimmers carried at the outer ends of the shorter cutter blades and lodged in the radial seats.

5. In a tunneling machine, a circular cutter head provided with a circular peripheral series of radial seats, some of the seats terminating at their outer ends in ears spaced apart to a greater extent than the width of the seats, cutter blades in said seats, the cutter blades in those seats having ears at their outer ends terminating short of said ears, and trimmers pivotally carried by said ears.

6. A cutter head for tunneling machines, comprising a hub, radial arms or spokes, and a rim carried by the spokes, the active face of the hub, spokes and rim being provided with pairs of parallel spaced ribs, each pair forming a seat for a cutter blade, said spokes and rim being connected to the hub by strengthening webs on the inactive faces, said hub being provided with a rearward extension beyond the limits of the strengthening webs, and said rearward extension being axially recessed to receive a supporting shaft.

In testimony that I claim the foregoing as my own, I have hereto affixed my signature in the presence of two witnesses.

JOHN PRUE KARNS.

Witnesses:
JOHN DAVIS,
BOTTS STROTHER.